United States Patent
Rayavarapu et al.

(10) Patent No.: US 10,203,882 B2
(45) Date of Patent: Feb. 12, 2019

(54) METHOD FOR MANAGING MULTIPLE BANDWIDTH BOOST SOLUTIONS CO-EXISTING IN AN ELECTRONIC DEVICE

(71) Applicant: Samsung Electronics Co., Ltd., Gyeonggi-do (KR)

(72) Inventors: Venkata Ratnakar Rao Rayavarapu, Bangalore (IN); Bhagwan Dass Swami, Bangalore (IN); Debjit Roy, Bangalore (IN); Giri Venkata Prasad Reddy Chintakuntla, Bangalore (IN); Jae-Won Jang, Suwon-si (KR); Kyoung-Jin Moon, Yongin-si (KR); Madhan Raj Kanagarathinam, Bangalore (IN); Ranjith Kumar, Bangalore (IN); Siva Sabareesh Dronamraju, Bangalore (IN); Sunil Kumar Venkata, Bangalore (IN); Vijay Kumar Mishra, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 23 days.

(21) Appl. No.: 15/132,078

(22) Filed: Apr. 18, 2016

(65) Prior Publication Data
US 2016/0308707 A1 Oct. 20, 2016

(30) Foreign Application Priority Data

Apr. 17, 2015 (IN) .............................. 1996/CHE/2015
Feb. 5, 2016 (IN) .............................. 1996/CHE/2015

(51) Int. Cl.
*G06F 3/06* (2006.01)
*G06F 13/40* (2006.01)
(Continued)

(52) U.S. Cl.
CPC ............ *G06F 3/061* (2013.01); *G06F 3/0659* (2013.01); *G06F 3/0688* (2013.01);
(Continued)

(58) Field of Classification Search
CPC .... G06F 3/061; G06F 3/0688; G06F 13/4022; G06F 13/4282; G06F 9/45558;
(Continued)

(56) References Cited

U.S. PATENT DOCUMENTS

| | | | |
|---|---|---|---|
| 2012/0157106 A1* | 6/2012 | Wang ..................... | H04W 16/04 455/446 |
| 2012/0224612 A1* | 9/2012 | Kim ....................... | H04L 1/0003 375/219 |

(Continued)

*Primary Examiner* — Walter J Divito

(57) ABSTRACT

Embodiments herein provide a method for managing multiple bandwidth boost solutions co-existing in an electronic device. The method includes identifying an ongoing data session associated with at least one of a first bandwidth boost solution and a second bandwidth boost solution. The method includes dynamically selecting at least one bandwidth boost solution based on at least one parameter. The method includes managing multiple bandwidth boost solutions, wherein the bandwidth boost solution can be either network dependent or independent bandwidth boost solution. The method includes determining that the identified event corresponds to a particular bandwidth boost solution or a combination of bandwidth boost solutions. The method includes dynamically selecting another bandwidth boost solution or a combination of bandwidth boost solutions upon determining that the identified event corresponds to a particular bandwidth boost solution or a combination of bandwidth boost solutions.

9 Claims, 15 Drawing Sheets

(51) Int. Cl.
*G06F 13/42* (2006.01)
*G06F 9/455* (2018.01)
*H04L 12/24* (2006.01)

(52) U.S. Cl.
CPC ...... *G06F 9/45558* (2013.01); *G06F 13/4022* (2013.01); *G06F 13/4282* (2013.01); *H04L 41/0654* (2013.01); *H04L 41/0681* (2013.01); *G06F 2009/45579* (2013.01); *G06F 2009/45583* (2013.01); *Y02D 10/14* (2018.01); *Y02D 10/151* (2018.01)

(58) Field of Classification Search
CPC ......... G06F 3/0659; G06F 2009/45583; G06F 2009/45579; H04L 41/0681; H04L 41/0654; Y02B 60/1228; Y02B 60/1235
See application file for complete search history.

(56) References Cited

U.S. PATENT DOCUMENTS

2013/0064198 A1* 3/2013 Krishnaswamy ... H04W 76/025
370/329
2015/0195326 A1* 7/2015 Suryavanshi ......... H04L 65/608
709/231

* cited by examiner

METHOD FOR MANAGING MULTIPLE BANDWIDTH BOOST SOLUTIONS CO-EXISTING IN AN ELECTRONIC DEVICE

CROSS-REFERENCE TO RELATED APPLICATION(S) AND CLAIM OF PRIORITY

The present application is related to and claims priority under 35 U.S.C. § 119(a) to an Indian patent provisional application filed in the Indian Intellectual Property Office on Apr. 17, 2015 and assigned Ser. No. 1996/CHE/2015 and an Indian patent complete application filed in the Indian Intellectual Property Office on Feb. 5, 2016 and assigned Ser. No. 1996/CHE/2015, the contents of which are incorporated herein by reference

TECHNICAL FIELD

The present disclosure relates to bandwidth boost solutions and more particularly to a method for managing multiple bandwidth boost solutions co-existing in an electronic device.

BACKGROUND

One of the major requirements in the development of internet technology is to provide methods which allow transfer of large files across different kinds of networks such as wired, wireless, sensor or optical, with high throughput and bandwidth efficiency. The usage of all available data connections in an electronic device, to send or receive data is apparently the most optimal way to accomplish the task at hand. In light of this objective, the existing technologies offer solutions which allow electronic devices to utilize all possible data connections to upload/download data.

The communication model involved in internet is a layered structure, in which various processing steps are segmented to be performed by each layer. The existing technologies offer particular bandwidth boost solutions, which operate at a specific layer, for using all the interfaces for data transfer in the electronic device. In order to utilize all the available network interfaces existing in an electronic device to send/receive data, appropriate changes have to be introduced in the different layers in order to provide bandwidth boost. Each layer of the communication model has a particular functionality and it operates coherently with other layers, for transfer of data across the internet. The bandwidth boost solutions are designed to introduce changes at those layers in which they are operating, in such a way that all the interfaces for data connection in the electronic device can be simultaneously used. There are certain bandwidth boost solutions such as multi-path transfer control layer (MPTCP), download booster (DB) or the like, which provide multiple data paths for data transfer between electronic devices. It is worthwhile to note that the individual boost solutions introduce necessary changes in the particular layer they have been configured to operate on, for boosting the link bandwidth. Thus, each boost solution offers a distinctive set of advantages and disadvantages pertaining to the layer they are operating.

There are certain scenarios in which a particular boost solution provides better throughput performance and bandwidth efficiency in comparison with other boost solutions. The efficiency of a boost solution is also constrained by the layer of the communication model upon which the boost solution is operating. In an example scenario, the MPTCP operates at the transport layer of the internet model. The efficiency of the MPTCP has dependency on the operator network to which the electronic device is connected. Thus the network operator is a parameter which has implications in the effectiveness of the services provided by the MPTCP solution. If there is an authentication failure of the user, expiry of certain subscription plans of the user, or any other network related failures, there can be a stagnation of service or poor performance by the MPTCP. In such circumstances, another bandwidth boost solution, which operates at a different layer, can be more effective in providing a seamless multi-path link for data transfer. Thus it is necessary for any electronic device to have bandwidth boost solutions operating at different layers of the communication model.

The above information is presented as background to help the reader for understanding the present disclosure. Applicants have made no determination and make no assertion as to whether any of the above might be applicable as Prior Art with regard to the present application.

SUMMARY

To address the above-discussed deficiencies, it is a primary object to provide, for use in an electronic device, a method for managing multiple bandwidth boost solutions co-existing in an electronic device.

Another object of the embodiments herein is to provide a method for identifying an ongoing data session associated with at least one of a first bandwidth boost solution and a second bandwidth boost solution.

Another object of the embodiments herein is to provide a method for dynamically selecting at least one bandwidth boost solution based on at least one parameter, for mitigating an identified event in the ongoing data session.

Another object of the disclosure is to provide a method for managing multiple bandwidth boost solutions, in which the bandwidth boost solution is a network dependent bandwidth boost solution, and a network independent bandwidth boost solution.

Another object of the invention is to provide a method for determining that the identified event corresponds to the first bandwidth boost solution.

Another object of the disclosure is to provide a method for dynamically selecting the second bandwidth boost solution upon determining that the identified event corresponds to the first bandwidth boost solution.

Another object of the disclosure is to provide a method for determining that the identified event corresponds to the first bandwidth boost solution and the second bandwidth boost solution, in which the ongoing data session is carried out in the first bandwidth boost solution and the second bandwidth boost solution.

Another object of the disclosure is to provide a method for dynamically selecting a third bandwidth boost solution and a fourth bandwidth boost solution upon determining that the identified event corresponds to the first bandwidth boost solution and the second bandwidth boost solution.

Another object of the disclosure is to provide a method for determining that the identified event corresponds to the first bandwidth boost solution, in which the ongoing data session is carried out in the first bandwidth boost solution and the second bandwidth boost solution.

Another object of the disclosure is to provide a method for dynamically selecting the second bandwidth boost solution and the third bandwidth boost solution upon determining that the identified event corresponds to the first bandwidth boost solution.

Accordingly the embodiments herein provide a method for managing multiple bandwidth boost solutions co-existing in an electronic device. The method includes identifying an ongoing data session associated with at least one of a first bandwidth boost solution and a second bandwidth boost solution. The method includes determining an erroneous event in the ongoing data session. The method includes dynamically selecting at least one new bandwidth boost solution based on at least one parameter. The bandwidth boost solution is a network dependent bandwidth boost solution or a network independent bandwidth boost solution.

Accordingly the embodiments herein provide an electronic device for managing the co-existing multiple bandwidth boost solutions. The electronic device is configured to identify an ongoing data session associated with at least one of a first bandwidth boost solution and a second bandwidth boost solution. The electronic device is configured to determine an erroneous event in the ongoing data session. The electronic device is configured to dynamically select at least one new bandwidth boost solution based on at least one parameter. The bandwidth boost solution is a network dependent bandwidth boost solution or a network independent bandwidth boost solution.

Accordingly the embodiments herein provide a computer program product comprising computer executable program code recorded on a computer readable non-transitory storage medium where the computer executable program code when executed causing the actions which includes identifying an ongoing data session associated with at least one of a first bandwidth boost solution and a second bandwidth boost solution. Further, the computer executable program code when executed causing the actions which includes determining an erroneous event in the ongoing data session. Further, the computer executable program code when executed causing the actions which includes dynamically selecting at least one new bandwidth boost solution based on at least one parameter.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
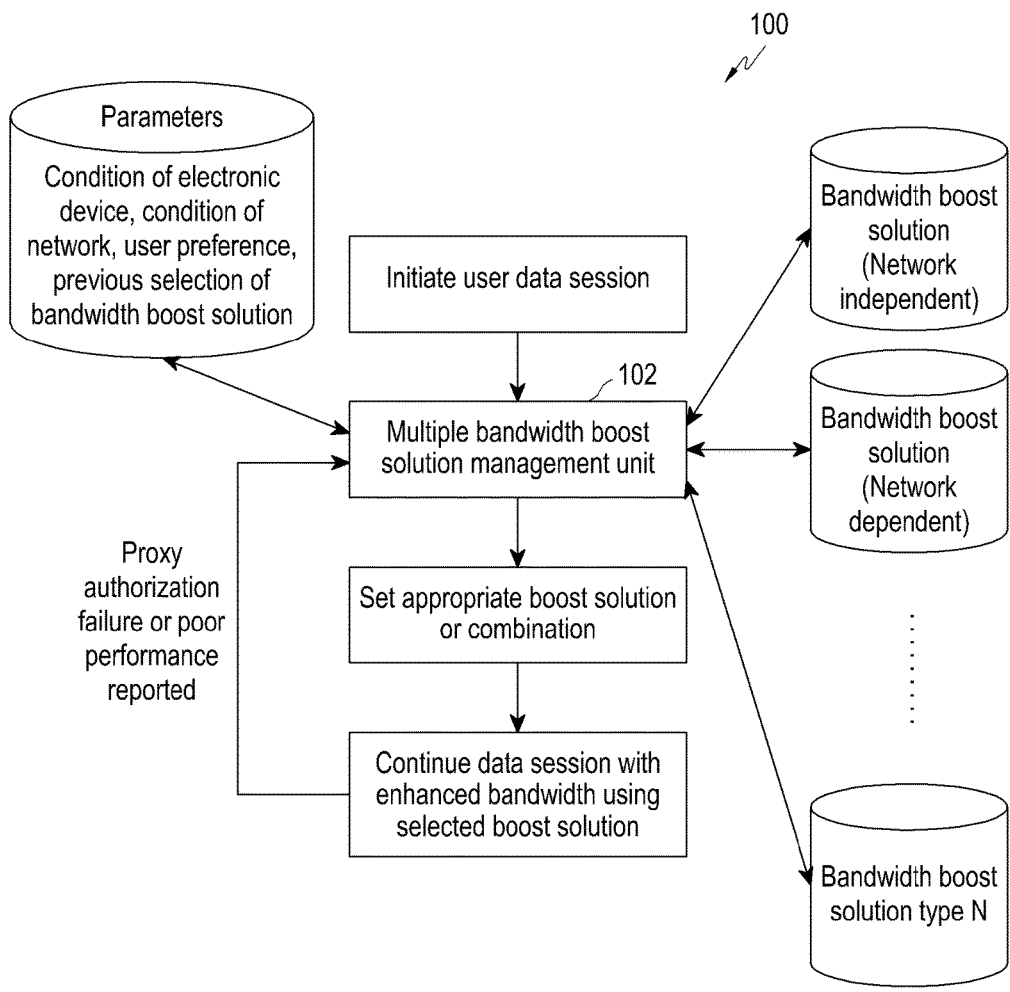
FIG. 1 illustrates an example overview of a system for managing multiple bandwidth boost solutions co-existing in an electronic device based on various parameters, according to the embodiments as disclosed herein.

FIGS. 1 through 8, discussed below, and the various embodiments used to describe the principles of the present disclosure in this patent document are by way of illustration and should not be construed in any way to limit the scope of the disclosure. Those skilled in the art will understand that the principles of the present disclosure may be implemented in any suitably arranged electronic device. The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

Accordingly the embodiments herein provide a method for managing multiple bandwidth boost solutions co-existing in an electronic device. The method includes identifying an ongoing data session associated with at least one of a first bandwidth boost solution and a second bandwidth boost solution. The method includes determining an erroneous event in the ongoing data session The method includes dynamically selecting at least one new bandwidth boost solution based on one or more parameters such as network congestion, user preferences, authorization of proxy server, poor bandwidth, authentication failure of the user, expiry of certain subscription plans of the user, or any other network related failures, or the like.

In an embodiment, the bandwidth boost solution is a network dependent bandwidth boost solution.

In an embodiment, the bandwidth boost solution is a network independent bandwidth boost solution.

In the present scenario, the electronic devices include bandwidth boost solutions which allow multiple interfaces such as Wi-Fi, mobile data, in an electronic device for data communication simultaneously for providing high throughput and data efficiency. The communication model involved in data transfer across the internet is organized into layers. Each layer performs specific functions for operating coherently with other layers for seamless data transfer. Each bandwidth boost solution is configured to operate in a particular layer. The proposed method allows co-existence of multiple bandwidth boost solutions in an electronic device. However, each layer can have either an individual or a combination of bandwidth boost solutions. This allows the users to select either one bandwidth boost solution or a combination of bandwidth boost solutions co-existing in a single layer or in different layers.

The bandwidth boost solutions introduce appropriate changes in the different layers in order to provide bandwidth boosting. Some of the existing bandwidth boost solutions are multi-path transfer control protocol (MPTCP), download booster (DB) or the like, which provide multiple data paths for data transfer between electronic devices. However, each bandwidth boost solution is having a distinctive set of features which enable a particular bandwidth boost solution to provide better throughput performance and bandwidth efficiency under certain conditions. In an example scenario, considering MPTCP which operates at the transport layer of the internet model. The efficiency of MPTCP as a bandwidth boost solution depends on certain parameters such as network congestions, user preferences, authorization of proxy server, poor bandwidth, authentication failure of the user, expiry of certain subscription plans of the user, or any other network related failures, or the like. Thus the network operator is critical in providing effective services by MPTCP. If there is an occurrence of an event associated with MPTCP, due to the parameters mentioned above, the performance of MPTCP deteriorates. In such circumstances, another bandwidth boost solution, which operates at a different layer, can be more effective in providing a seamless multi-path link for data transfer. In an example scenario, DB which operates at the application layer of the internet model can be more effective in such an instance. Thus, it is necessary for any electronic device to provide support for allowing the co-existence of a plurality of bandwidth boost solutions operating at different layers of the communication model. The proposed method allows dynamic selection of different bandwidth boost solutions, upon detecting a performance downfall or failure of performance of bandwidth boost solution in the ongoing data session.

The proposed method allows tracking the pattern of power consumption of the battery of an electronic device whilst a particular bandwidth boost solution is operational. A pre-defined threshold is set for the battery, for a particular bandwidth boost solution. When the energy level of battery of the electronic device, with a particular bandwidth boost solution, drops below a pre-defined threshold, the user is prompted to dynamically select another bandwidth boost solution.

The proposed method performs machine learning and heuristics based on the user action of enabling or disabling individual or a combination of bandwidth boost solutions. The method allows tracking the user pattern of selection of a particular bandwidth boost solution, specific to the location of the electronic device and dynamically selecting the particular bandwidth boost solution when that particular location is detected.

The method provides (User Interface/User Experience) UI/UX to users which display the data statistics which include amount of data uploaded/downloaded using a particular bandwidth boost solution or a combination of bandwidth boost solutions. The method allows tracking the performance of the bandwidth boost solutions co-existing in an electronic device. The method allows tracking the user pattern of selecting a particular bandwidth boost solution at a particular instant of time or a time period. The method allows tracking the percentage bandwidth boost provided by a particular bandwidth boost solution to user. The method provides an interface to the users for selecting a bandwidth boost solution at all instances.

In an example, the electronic device can be a mobile phone, a Personal Digital Assistant (PDA), a smart phone, a tablet, a personal computer or a portable device, or any electronic device.

Referring now to the drawings and more particularly to FIGS. 1 through 8, where similar reference characters denote corresponding features consistently throughout the figures, there are shown preferred embodiments.

FIG. 1 illustrates an example overview of a system 100 for managing multiple bandwidth boost solutions co-existing in an electronic device based on various parameters, according to the embodiments as disclosed herein.

As depicted in FIG. 1, the proposed system 100 allows incorporating a plurality of bandwidth boost solutions in a single electronic device. The bandwidth boost solutions can be either network dependent or network independent. The user of the electronic device initiates a data session with a particular bandwidth boost solution. The proposed system provides a multiple bandwidth boost solution management unit 102, which can select either one or a combination of the bandwidth boost solutions for providing higher bandwidth efficiency, higher throughput and data connection stability. The multiple bandwidth boost solution management unit 102, allows dynamic selection of bandwidth boost solutions in order to mitigate an identified event which is associated with the selected bandwidth boost solution which is currently operational in an ongoing data session. The selection of a particular bandwidth boost solution is based on either one or a combination of various parameters such as user preference, operator preference, network condition parameters, network congestion parameters, proxy authentication failure scenarios, bandwidth boost solution deployment limitations (like multi-path (MP) capable middle boxes, HTTP 1.1 support), electronic device condition parameters (like low-battery), poor performance of throughput, or the like. The multiple bandwidth boost solution management unit 102, provides a user interface which lists all the available bandwidth boost solutions in the electronic device. This allows users to select individual or a combination of bandwidth boost solutions according to suitability and requirement. The multiple bandwidth boost solution management unit 102, performs heuristics and machine learning for identifying the combinations which are best as per the timings and specific usage pattern. The multiple bandwidth boost solution management unit 102, performs the necessary adjustments in the electronic device for providing support for co-existence of multiple bandwidth boost solutions.

Figure 2:
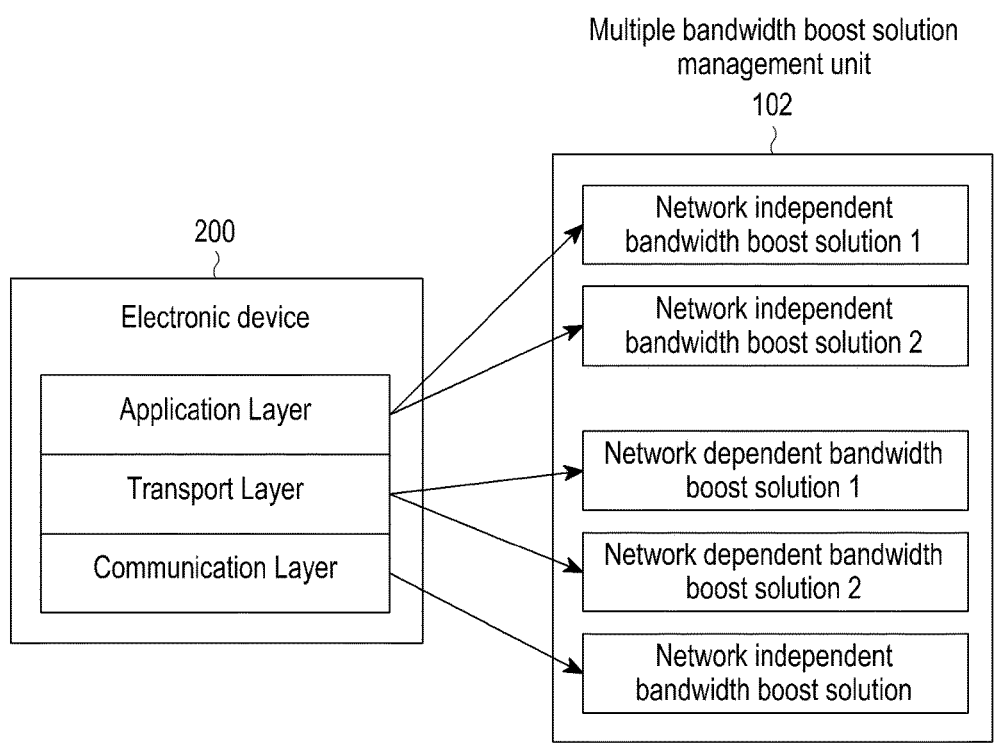
FIG. 2 illustrates various network dependent and network independent bandwidth boost solutions co-existing in the electronic device, according to the embodiments as disclosed herein.

FIG. 2 illustrates various network dependent and network independent bandwidth boost solutions co-existing in the electronic device 200, according to the embodiments as disclosed herein.

The electronic device 200 provides support for incorporating a plurality of bandwidth boost solutions. As depicted in FIG. 2, the communication model existing in the electronic device 200 consists of a number of layers (application layer, transport layer, communication layer). Each layer performs specific functions, which allow a particular bandwidth boost solution to be implemented. The bandwidth boost solutions provide multiple data paths for data transfer between multiple electronic devices. The bandwidth boost solutions are configured to operate in a particular layer, in which certain changes are introduced for providing the required bandwidth boost. The bandwidth boost solutions allow usage of all available interfaces for data transfer in the electronic device 200. The bandwidth boost solutions can be either network dependent or network independent. The method allows usage of an individual or a combination of bandwidth boost solutions in an ongoing data session. However, each layer can support at least one or a combination of bandwidth boost solutions. The bandwidth boost solutions provide a higher throughput and bandwidth operations in which they are configured to operate. In an example scenario, multi-path transfer control layer (MPTCP) operates at the transport layer while download booster (DB) operates at the application layer. The dependence of operability of a bandwidth boost solution on a particular layer of the communication model makes the respective bandwidth boost solution, provide advantages and have certain limitations in certain conditions.

In an example scenario, MPTCP operates at the transport layer of the internet model. The efficiency of MPTCP depends on the operator network to which the electronic device 200 is connected. If there is a failure in authenticating a user due to the expiry of a plan subscribed by the user, or any other network related failures, the performance of MPTCP can decrease significantly. In such circumstances another bandwidth boost solution, which operates at a transport layer and/or in a different layer (application, communication) can be more effective in providing the targeted quality of service (QoS). Thus, it is necessary for the electronic device 200, to provide support for multiple bandwidth boost solutions operating at either same or different layers of the communication model. In an embodiment, the proposed method can have DB to operate at application layer and MPTCP at the transport layer.

Figure 3A:
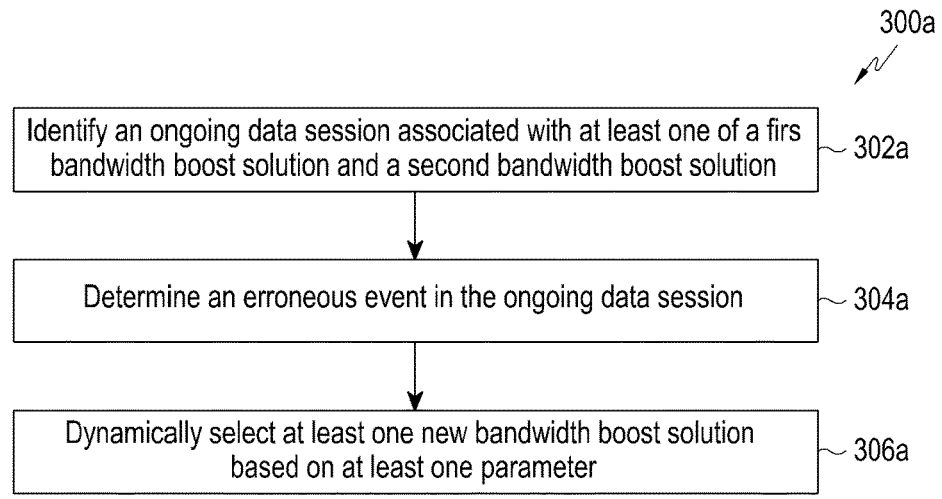
FIG. 3A is a flowchart depicting a method for managing multiple bandwidth boost solutions co-existing in an electronic device, according to the embodiments as disclosed herein.

FIG. 3A is a flowchart depicting a method 300a for managing multiple bandwidth boost solutions co-existing in an electronic device 200, according to the embodiments as disclosed herein. The method 300a allows support for incorporating a plurality of bandwidth boost solutions in the electronic device 200. The method 300a, allows individual or a combination of bandwidth boost solutions to operate in a single or combination of layers. Thus the electronic device 200 can utilize either one or a plurality of interfaces for connecting to the internet for data transfer. The method 300a, allows dynamically switching individual or a combination of bandwidth boost solutions upon detecting an event in either one or a combination of bandwidth boost solution(s). The events are based on parameters such as network conditions, condition of electronic device 200, failure of proxy server or authentication, lack of support for different protocols or the like. The method 300a allows dynamic switching of either one or a combination of bandwidth boost solutions depending on the occurrence of events in either one or a combination of bandwidth boost solution(s).

At step 302a, the method 300a includes identifying an ongoing data session associated with at least one of a first bandwidth boost solution and a second bandwidth boost solution. The multiple bandwidth boost solution management unit 102, selects either a single or a combination of bandwidth boost solutions appropriate for providing high throughput rate and bandwidth efficiency.

In an embodiment, an ongoing data session can operate using either MPTCP or DB bandwidth boost solution. In another embodiment, the first bandwidth boost solution can be MPTCP, and the second bandwidth boost solution is DB. In yet another embodiment, an ongoing data session can have a combination of bandwidth boost solutions operating at either a single or multiple layers of the communication model.

At step 304a, the method 300a includes determining an erroneous event in the ongoing data session. The erroneous event generally affects the functioning of a particular layer. This leads to deterioration of services provided by the bandwidth boost solution operating at that particular layer. Thus, it imperative to select another bandwidth boost solution operating at the same layer, which can effectively mitigate the event or a bandwidth boost solution operating in a different layer.

At step 306a, the method 300a includes dynamically selecting at least one new bandwidth boost solution based on at least one parameter. The parameters include condition of electronic device, state of the network in which the electronic device 200 is connected, user preferences, previous selection of bandwidth boost solutions, authentication failure with proxy server, poor bandwidth performance or the like. The bandwidth boost solutions provide higher efficiency in certain conditions. In an example scenario, MPTCP provides higher bandwidth efficiency when the network congestion is low. As such, the parameters are substantial with respect to selection of particular bandwidth boost solutions operating in different layer(s). The parameters also have implications in the proper functioning of a bandwidth boost solution.

In an example scenario, authentication failure with the proxy server involves the network operator, which may affect the performance of bandwidth boost solutions such as MPTCP, which operates at the transport layer. In another example scenario, considering the electronic device 200 can be in an ongoing data session with a bandwidth boost solution configured to operate in the application layer, which consumes significant power. In such scenarios, the power consumption of the battery of an electronic device 200 can be effectively utilized by another bandwidth boost solution which operates in the transport layer. When the energy level of battery in the electronic device 200, drops below a pre-defined threshold, the user is prompted to dynamically select another bandwidth boost solution which operates in the transport layer or the application layer which consumes less power.

The various actions, acts, blocks, steps, or the like in the method 300a may be performed in the order presented, in a different order or simultaneously. Further, in some embodiments, some of the actions, acts, blocks, steps, or the like may be omitted, added, modified, skipped, or the like without departing from the scope of the disclosure.

Figure 3B:
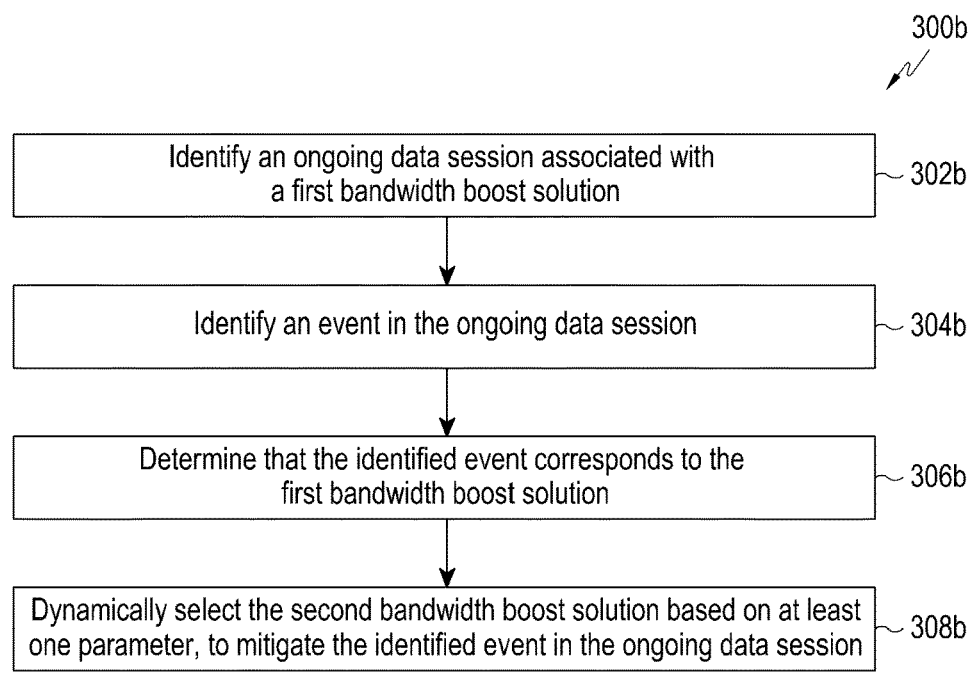
FIG. 3B is a flowchart depicting a method for dynamically selecting a bandwidth boost solution upon identifying an event associated with a current bandwidth boost solution, according to the embodiments as disclosed herein.

FIG. 3B is a flowchart depicting a method 300b, for dynamically selecting a bandwidth boost solution upon identifying an event associated with a current bandwidth boost solution, according to the embodiments as disclosed herein. The multiple bandwidth boost solution management unit 102, selects one bandwidth boost solution appropriate for providing high throughput rate and bandwidth efficiency.

In an embodiment, considering an ongoing data session is currently associated with one bandwidth boost solution. The method 300b identifies an event associated with the bandwidth boost solution. Upon determining that the event corresponds to the current bandwidth boost solution, the method 300b selects another bandwidth boost solution.

At step 302b, the method 300b includes identifying an ongoing data session associated with a first bandwidth boost solution. In an embodiment, the ongoing data session is considered to be operational with a single bandwidth boost solution. According to the user requirements, a suitable bandwidth boost solution can be selected. The user requirements prompt the electronic device 200, or the user to select a particular bandwidth boost solution, operating in a particular layer, which can suit the user requirements. In an example scenario, considering the requirement of efficient congestion control in network, MPTCP, which operates at the transport layer, can be an effective solution.

At step 304b, the method 300b includes identifying an event in the ongoing data session. The performance of the bandwidth boost solution, operating at a particular layer, can deteriorate in certain situations due to occurrence of certain events. The events can be condition (example: battery) of the electronic device 200, congestion in the network, authentication failure or the like. The events in general, have implications in proper functioning of specific layers of the communication model. In an example scenario, the instance in which a server does not support a version of hypertext transport protocol (HTTP), which is essential for proper functioning of a particular bandwidth boost solution in the application layer, is considered as an event. In an embodiment, in which the ongoing data session operates with a single bandwidth boost solution the above mentioned instance is considered an event which is identified by the proposed method.

At step 306b, the method 300b includes determining that the identified event corresponds to the first bandwidth boost solution. The bandwidth boost solution associated with the ongoing data session may experience an event which prevents proper functioning of the bandwidth boost solution. The throughput rate or bandwidth efficiency of the data links can deteriorate due to the occurrence of the event.

At step 308b, the method 300b includes dynamically selecting the second bandwidth boost solution based on at least one parameter, to mitigate the identified event in the ongoing data session. The proposed method 300b provides support for incorporating and managing multiple bandwidth boost solutions in a single electronic device 200. As a result, it is possible for the electronic device 200, to dynamically select another bandwidth boost solution upon detecting an event in the operational bandwidth boost solution. The event which prevents seamless functioning of the bandwidth boost solution operating in the ongoing data session, is based on parameters such as network conditions, condition of electronic device 200, failure of proxy server or authentication, lack of support for different protocols or the like. The parameters hinder the processes of a particular layer in which a bandwidth boost solution is configured to operate. Thus it is imperative to switch to a second bandwidth boost solution, operating in a different layer, which is immune to the influence of the occurred event. In an example scenario, if the server is not capable of providing support for a particular version of HTTP, a bandwidth boost solution which operates at either transport layer or communication layer is used for mitigating the event.

The various actions, acts, blocks, steps, or the like in the method 300b may be performed in the order presented, in a different order or simultaneously. Further, in some embodiments, some of the actions, acts, blocks, steps, or the like may be omitted, added, modified, skipped, or the like without departing from the scope of the disclosure.

Figure 3C:
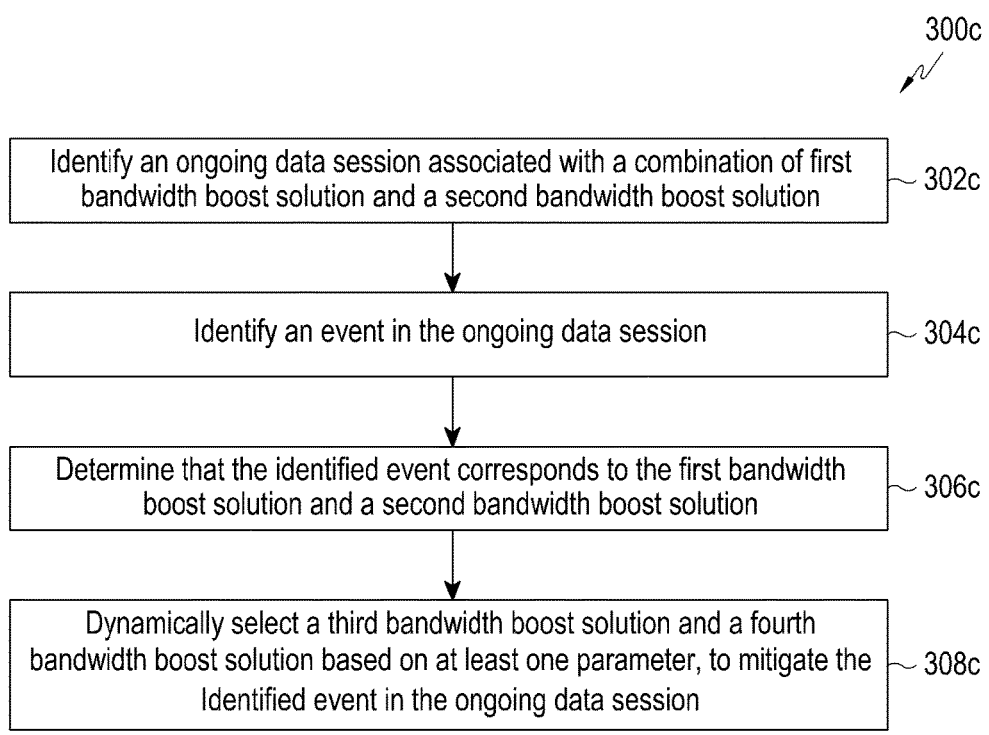
FIG. 3C is a flowchart depicting the method for dynamically selecting a combination of bandwidth boost solutions upon identifying an event in the current combination of bandwidth boost solutions, according to the embodiments as disclosed herein.

FIG. 3C is a flowchart depicting the method 300c, for dynamically selecting a combination of bandwidth boost solutions upon identifying an event in the current combination of bandwidth boost solutions, according to the embodiments as disclosed herein. The multiple bandwidth boost solution management unit 102, selects a combination of bandwidth boost solutions appropriate for providing high throughput rate and bandwidth efficiency.

In an embodiment, considering an ongoing data session is currently associated with a combination of first bandwidth boost solution and second bandwidth boost solution. The method 300c identifies an event associated with the combination of first bandwidth boost solution and second bandwidth boost solution. Upon detecting the event in the current bandwidth boost solutions, the method 300c selects another combination of third bandwidth boost solution and fourth bandwidth boost solution. The usage of the combination of bandwidth boost solution allows significant increase in throughput rate and bandwidth efficiency.

At step 302c, the method 300c includes identifying an ongoing data session associated with a combination of first bandwidth boost solution and a second bandwidth boost solution. In an embodiment, the ongoing data session is considered to be operational with a combination of bandwidth boost solutions. According to the user requirements, a suitable combination of bandwidth boost solutions can be selected. The user requirements prompt the electronic device 200, or the user to select a particular combination of bandwidth boost solutions, operating in either one particular layer or in different layers, in order to meet the user requirements. In an example scenario, considering the requirement of both efficient congestion control in network and support for all versions of the HTTP, the combination of MPTCP and DB, which operate in the transport layer and application layers respectively, can be the effective combination of bandwidth boost solutions.

At step 304c, the method 300c includes identifying an event in the ongoing data session. The performance of the combination of different bandwidth boost solutions, operating at a particular layer or different layers, can deteriorate in certain situations due to occurrence of certain events. The events can be status of the electronic device 200, congestion in the network, authentication failure or the like. The events in general, have implications in proper functioning of specific layers of the communication model. In an example scenario, the instance in which there is a failure in authenticating a user by the proxy server, another bandwidth boost solution configured to operate in the transport layer or in the application layer has to be selected. In another event if a server in the internet does not support a version of HTTP, which is essential for proper operation of a particular bandwidth boost solution in the application layer, another boost solution operating in the application layer has to be selected. In an embodiment, in which the ongoing data session operates with the combination of bandwidth boost solutions the above mentioned instances are considered as an event which is identified by the proposed method.

At step 306c, the method 300c includes determining that the identified event corresponds to the first bandwidth boost solution and the second bandwidth boost solution. The bandwidth boost solutions associated with the ongoing data session may experience an event, which hinders proper functioning of the layers in which the bandwidth boost solution is configured to operate. This in turn, prevents proper operation of the bandwidth boost solutions. The throughput rate or bandwidth efficiency of the data links can deteriorate due to the occurrence of the events.

At step 308c, the method 300c includes dynamically selecting a third bandwidth boost solution and a fourth bandwidth boost solution based on at least one parameter, to mitigate the identified event in the ongoing data session. The proposed method 300c provides support for incorporating and managing multiple bandwidth boost solutions in a single electronic device 200. As a result, it is possible for the electronic device 200 to dynamically select another combination of bandwidth boost solutions upon detecting an event in the operational bandwidth boost solutions. The event which prevents seamless functioning of the bandwidth boost solution operating in the ongoing data session, is based on parameters such as network conditions, condition of electronic device 200, failure of proxy server or authentication, lack of support for different protocols or the like. The parameters hinder the processes of a particular layer in which the combination of bandwidth boost solution is configured to operate. Thus it is imperative to switch to a combination of a third bandwidth boost solution and a fourth bandwidth boost solution, operating in either same or different layers, which are immune to the influence of the occurred event. The ongoing data session thus continues with the combination of third and fourth bandwidth boost solutions.

In an embodiment, to mitigate the event in both bandwidth boost solutions operational in an ongoing data session, the method 300c can select the third or fourth bandwidth boost solution. The various actions, acts, blocks, steps, or the like in the method 300c may be performed in the order presented, in a different order or simultaneously. Further, in some embodiments, some of the actions, acts, blocks, steps, or the like may be omitted, added, modified, skipped, or the like without departing from the scope of the disclosure.

Figure 3D:
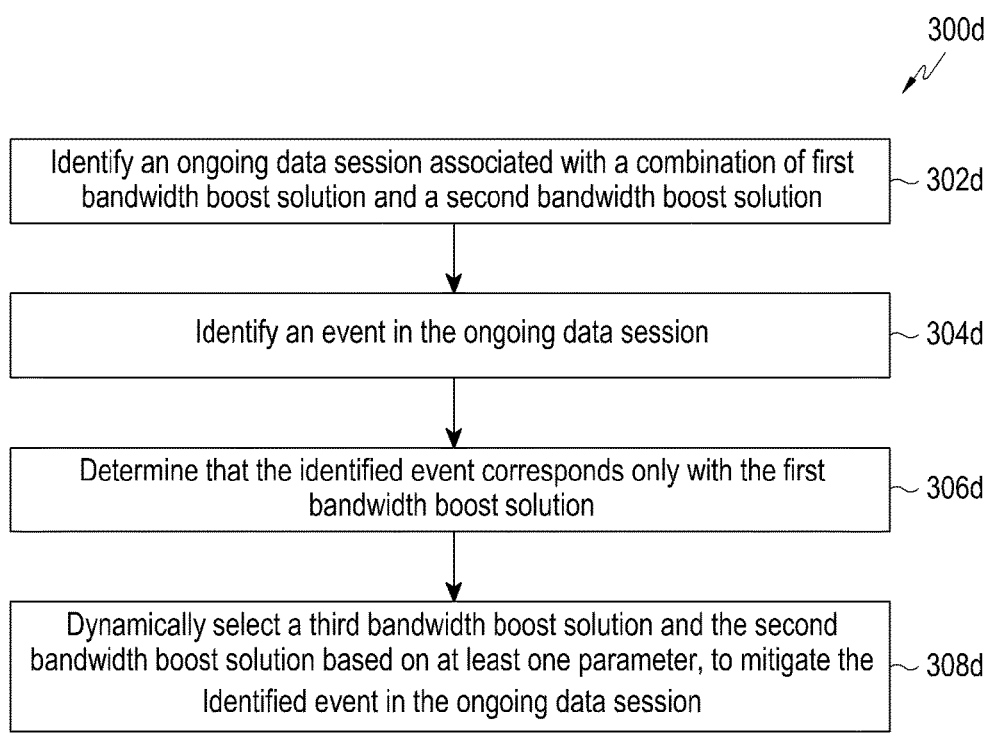
FIG. 3D is a flowchart depicting the method for dynamically selecting a bandwidth boost solution upon identifying an event in a bandwidth boost solution amongst the current combination of bandwidth boost solutions, according to the embodiments as disclosed herein.

FIG. 3D is a flowchart depicting the method 300d, for dynamically selecting a bandwidth boost solution upon identifying an event in a bandwidth boost solution amongst the current combination of bandwidth boost solutions, according to the embodiments as disclosed herein. The multiple bandwidth boost solution management unit 102, selects a combination of bandwidth boost solutions appropriate for providing high throughput rate and bandwidth efficiency.

In an embodiment, considering an ongoing data session is currently associated with a combination of first bandwidth boost solution and second bandwidth boost solution. The method 300d identifies an event associated only with the first bandwidth boost solution. Upon detecting the event in the first bandwidth boost solution, the method 300d selects the combination of third bandwidth boost solution and second bandwidth boost solution.

At step 302d, the method 300d includes identifying an ongoing data session associated with a combination of first bandwidth boost solution and a second bandwidth boost solution. In an embodiment, the ongoing data session is considered to be operational with a combination of bandwidth boost solutions. According to the user requirements, a suitable combination of bandwidth boost solutions can be selected. The user requirements prompt the electronic device 200, or the user to select a particular combination of bandwidth boost solutions, operating in either one particular layer or in different layers, in order to meet the user requirements. In an example scenario, considering the requirement of both efficient congestion control in network and support for all versions of the HTTP, the combination of MPTCP and DB, which operate in the transport layer and application layers respectively, can be the effective combination of bandwidth boost solutions.

At step 304d, the method 300d includes identifying an event in the ongoing data session. The performance of the one bandwidth boost solution amongst the combination of different bandwidth boost solutions, operating at a particular layer, can deteriorate in certain situations due to occurrence of certain events. The event can be status of the electronic device 200, congestion in the network, authentication failure or the like. The events in general, have implications in proper functioning of specific layers of the communication model. In an example scenario, the instance in which there is a failure in authenticating a user by the proxy server, another bandwidth boost solution configured to operate in the transport layer has to be selected. In another event, if a server in the interne does not support a version of HTTP, which is essential for proper operation of a particular bandwidth boost solution in the application layer, another boost solution operating in the application layer has to be selected. In an embodiment, in which the ongoing data session operates with the combination of bandwidth boost solutions, any one of the above mentioned instances can considered as an event, hinders the proper operation of a bandwidth boost solution in the combination of the bandwidth boost solutions. The proposed method 300d identifies the event associated with the bandwidth boost solution amongst the combination of bandwidth boost solutions.

At step 306d, the method 300d includes determining that the identified event corresponds with the first bandwidth boost solution. The bandwidth boost solutions associated with the ongoing data session may experience an event, which hinders proper functioning of the layers in which the bandwidth boost solution is configured to operate. This in turn, prevents proper functioning of the bandwidth boost solution. The throughput rate or bandwidth efficiency of the data links can deteriorate due to the occurrence of the event.

At step 308d, the method 300d includes dynamically selecting a third bandwidth boost solution and the second bandwidth boost solution based on at least one parameter, to mitigate the identified event in the ongoing data session. The proposed method 300d provides support for incorporating and managing multiple bandwidth boost solutions in a single electronic device 200. As a result, it is possible for the electronic device to dynamically select another bandwidth boost solution upon detecting an event in one of the operational bandwidth boost solutions. The event which prevents seamless functioning of the bandwidth boost solution operating in the ongoing data session, is based on parameters such as network conditions, condition of electronic device 200, failure of proxy server or authentication, lack of support for different protocols or the like. The parameters hinder the processes of a particular layer in which the bandwidth boost solution is configured to operate. Thus it is imperative to switch to a third bandwidth boost solution, operating in either same or different layer, which is immune to the influence of the occurred event. The ongoing data session thus continues with the combination of third and second bandwidth boost solutions, in which the first bandwidth boost solution is replaced by the third bandwidth boost solution.

The various actions, acts, blocks, steps, or the like in the method 300d may be performed in the order presented, in a different order or simultaneously. Further, in some embodiments, some of the actions, acts, blocks, steps, or the like may be omitted, added, modified, skipped, or the like without departing from the scope of the disclosure.

Figure 4A:
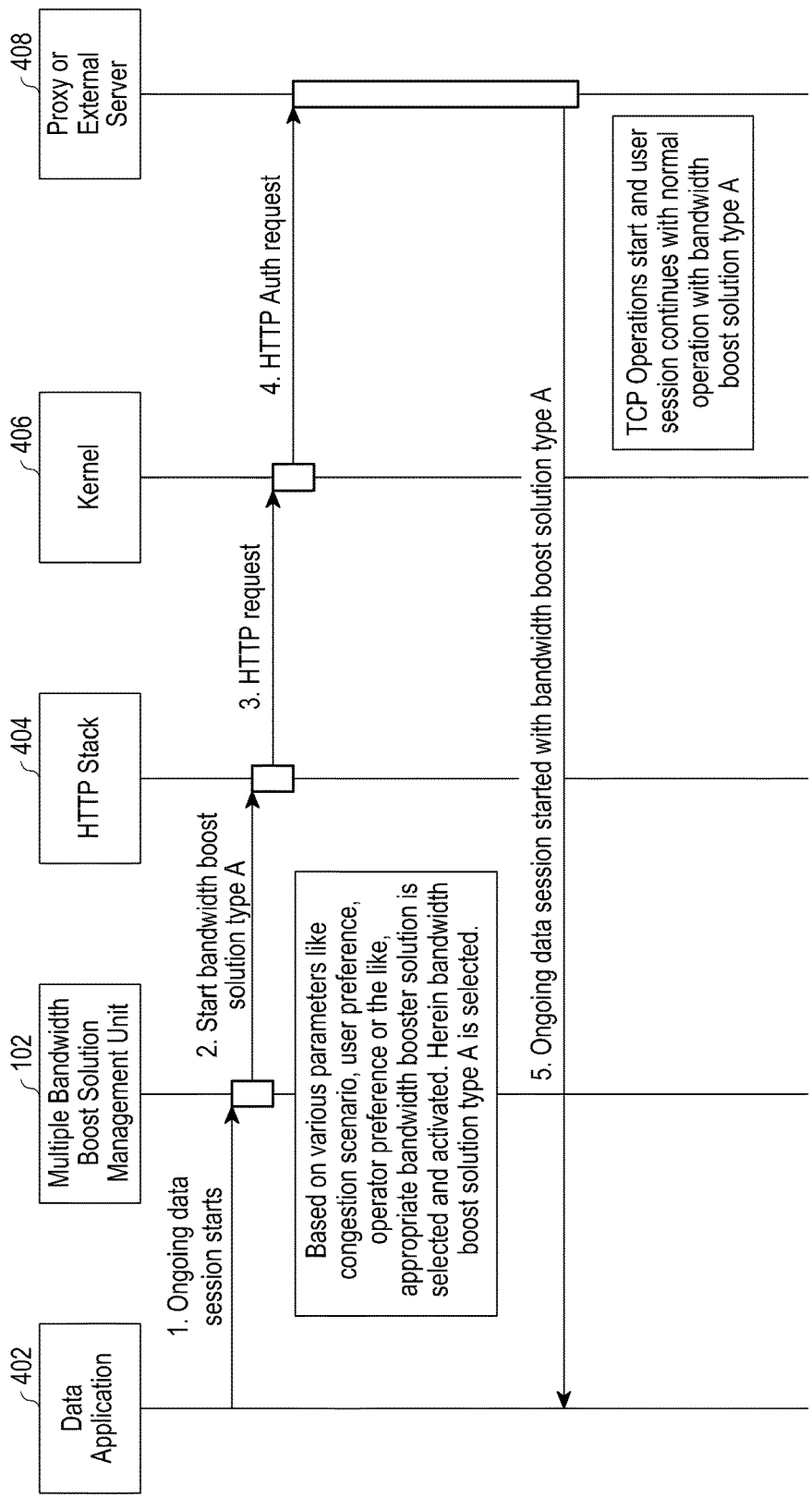
FIG. 4A and 4B are a sequence diagram depicting the steps of selecting a bandwidth boost solution upon identifying an event in the current bandwidth boost solution, according to the embodiments as disclosed herein.
Figure 4B:
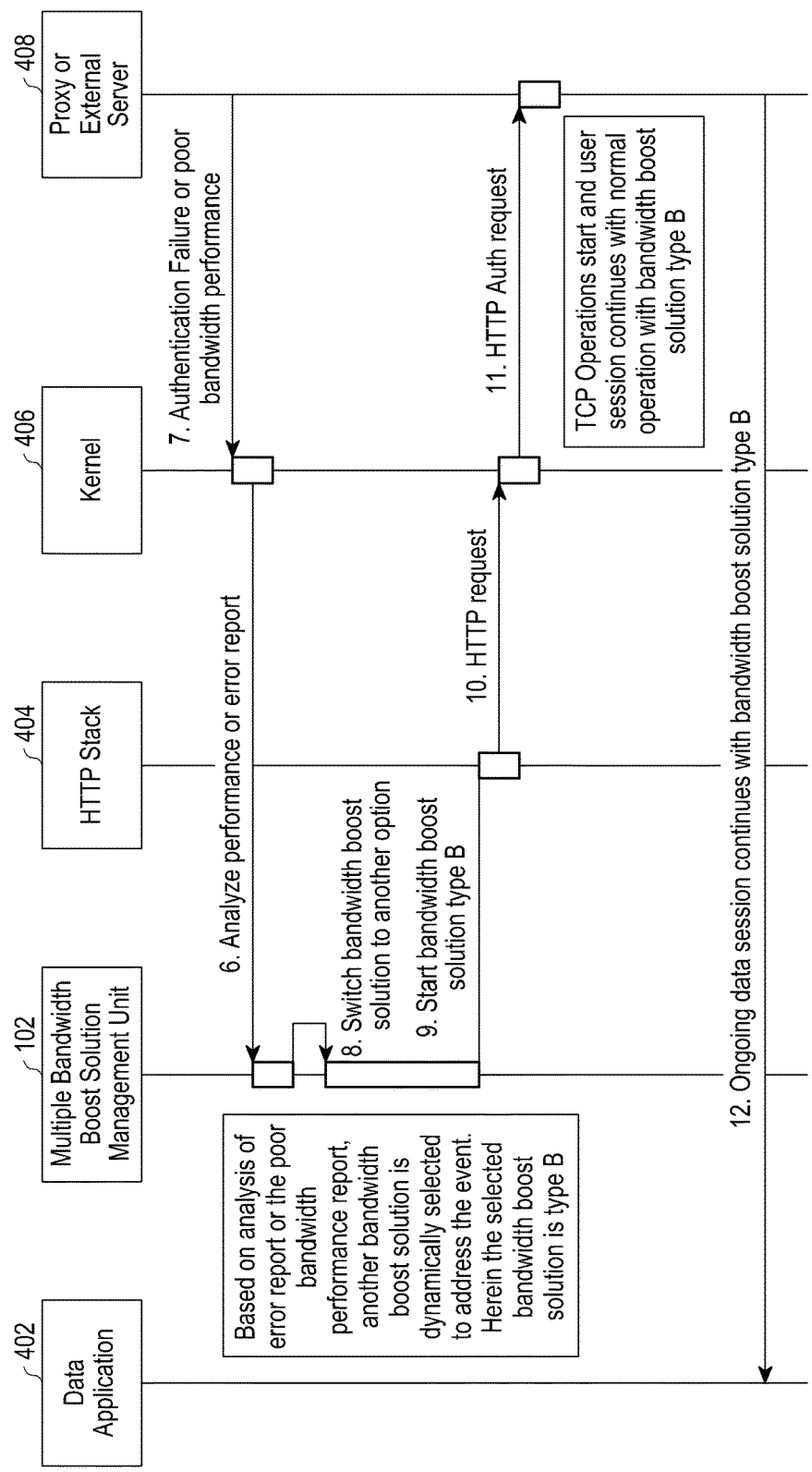

FIG. 4A and 4B are a sequence diagram depicting the steps of selecting a bandwidth boost solution upon identifying an event in the current bandwidth boost solution, according to the embodiments as disclosed herein.

In an embodiment, the interactions are ongoing between several blocks consisting of data application 402, multiple bandwidth boost solution management unit 102, HTTP stack 404, kernel 406 and proxy server or external server 408. The data application 402 is a feature in the electronic device 200, which allows the user to connect the electronic device 200, to the interne. Initially, the user starts the ongoing data session using the data application. The multiple bandwidth boost solution management unit 102, allows managing and support for incorporating multiple bandwidth boost solutions within a single electronic device 200. A bandwidth boost solution 'A' is selected in the ongoing session based on various parameters such as congestion scenario, user preference, operator preference or the like. The bandwidth boost solution 'A' can be considered to be a network dependent bandwidth boost solution. Thus the appropriate bandwidth booster solution is selected and activated. The HTTP stack 404 makes the HTTP request through the operating system kernel 406. The kernel 406 sends a HTTP authorization request to the proxy or external server 408. The proxy or external server 408, provides the HTTP response and ongoing data session is started with bandwidth boost solution type 'A'. The transport control protocol (TCP) operations start and user session continues with normal operation with bandwidth boost solution type 'A'. However, after bandwidth boosting performance analysis and error report analysis, an authentication failure and poor bandwidth performance are detected. This event can have implications on network dependent bandwidth boost solutions. As a result, another bandwidth boost solution 'B' which can be network dependent or network independent, is dynamically selected to address the event. Once bandwidth boost solution 'B' becomes operational, the HTTP signaling information is exchanged as before. The TCP operations start and ongoing data session continues with normal operation with bandwidth boost solution 'B'.

Figure 5A:
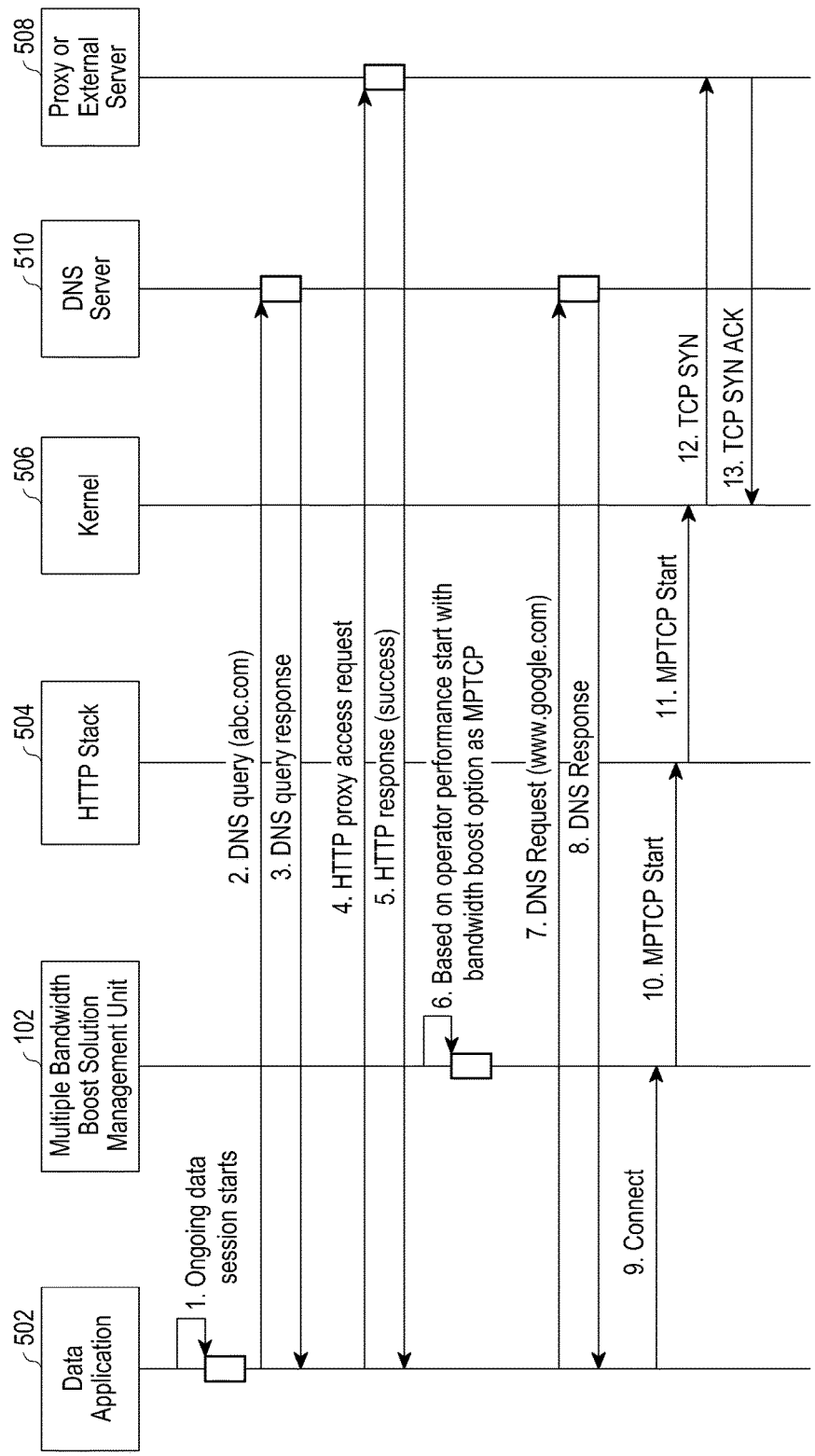
FIG. 5A and 5B are an example scenario of a sequence diagram depicting the steps of selecting download booster solution upon identifying an event in MPTCP solution, according to the embodiments as disclosed herein.
Figure 5B:
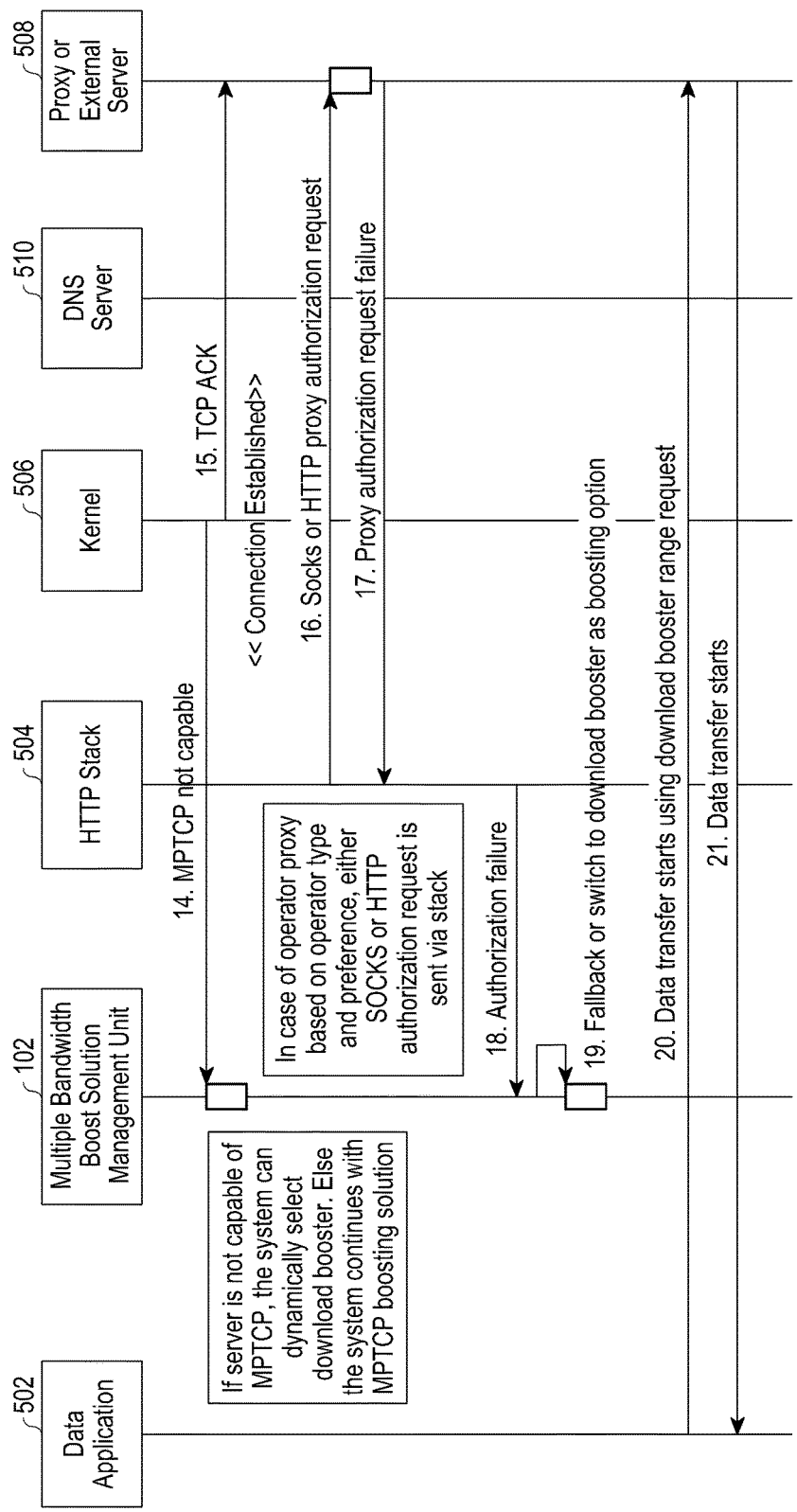

FIG. 5A and 5B are an example scenario of a sequence diagram depicting the steps of selecting download booster solution upon identifying an event in MPTCP solution, according to the embodiments as disclosed herein.

In an embodiment, the interactions are ongoing between several blocks consisting of data application 502, multiple bandwidth boost solution management unit 102, HTTP stack 504, kernel 506, proxy server or external server 508 and domain name server (DNS) 510. The data application 502 is a feature in the electronic device 200, which allows the user to connect the electronic device 200, to the internet. Initially, the user starts the ongoing data session using the data application. The data application makes a DNS query to the DNS server 510 for mapping the internet protocol (IP) address abc.com'. The DNS server 510 sends the DNS query response. The multiple bandwidth boost solution management unit 102, allows managing and support for incorporating multiple bandwidth boost solutions within a single electronic device 200. The HTTP stack 504, makes the HTTP proxy access request to the proxy or external server 508. The proxy or external server 508 provides the HTTP response which is a success. Based on the operator performance the multiple bandwidth boost solution management unit 102, selects bandwidth boost solution as MPTCP. Once the data application 502, allows the electronic device 200, to connect to the internet with MPTCP as the bandwidth boost solution, the TCP handshaking begins. The kernel 506 and proxy or external server 508, exchange the TCP handshaking messages 'TCP SYN' (TCP synchronization), 'TCP SYN ACK' (TCP synchronization acknowledgement), and 'TCP ACK' (TCP acknowledgement), between them. Once TCP handshaking messages are successfully exchanged, internet connection is established. However, if MPTCP cannot meet the QoS requirements, the proposed method can select DB. The HTTP stack 504 makes a HTTP request to the proxy or external server 508 for authorization of data transmission. The proxy or external server 508 fails to authenticate the user. As a result, MPTCP cannot be used as bandwidth boost solution. The method dynamically selects DB as the bandwidth boost solution and data transfer begins.

Figure 6A:
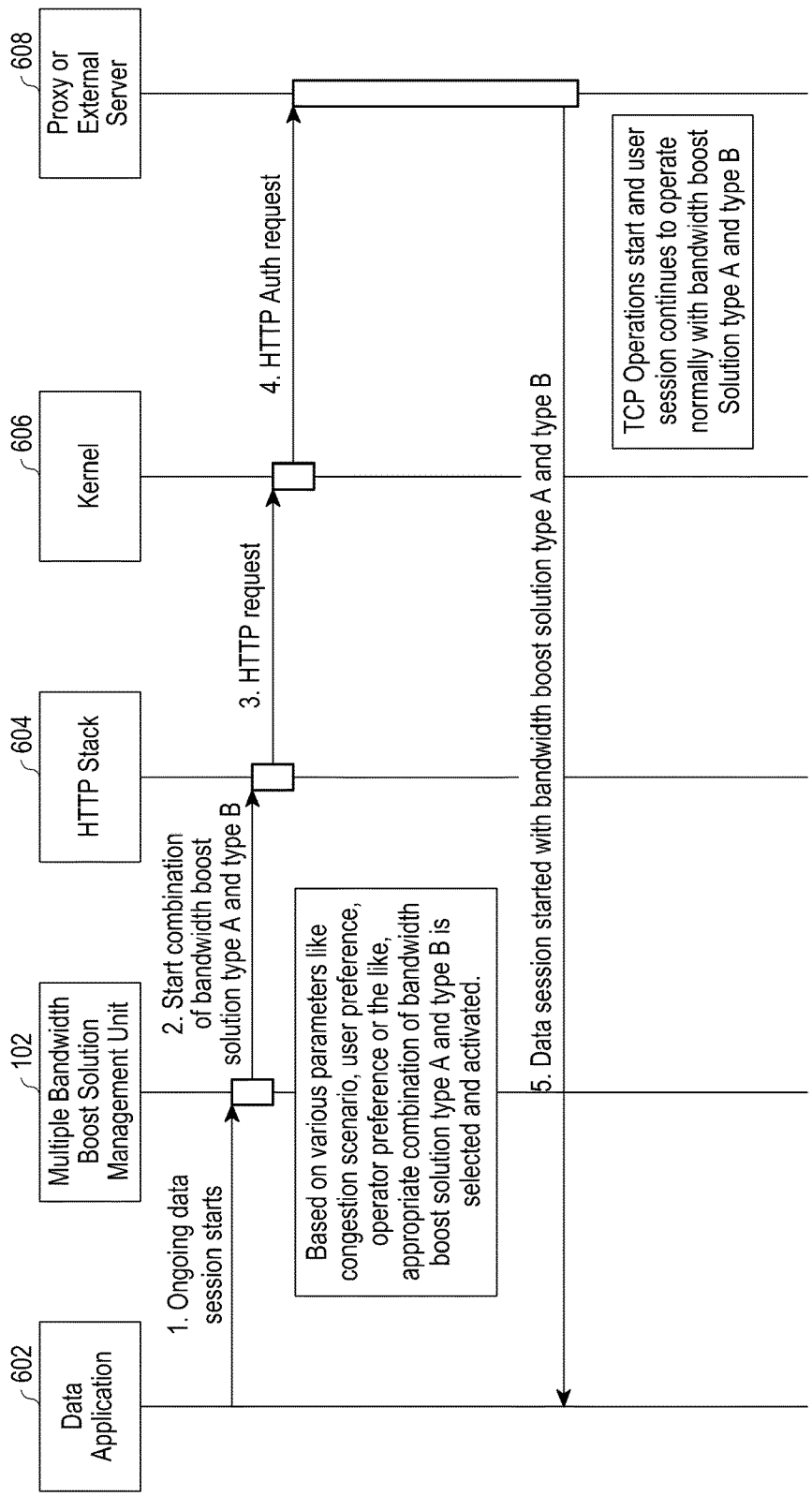
FIG. 6A and 6B are a sequence diagram depicting the steps for selecting a combination of bandwidth boost solutions upon identifying an event in one of the current bandwidth boost solutions amongst the combination of bandwidth boost solutions, according to the embodiments as disclosed herein.
Figure 6B:
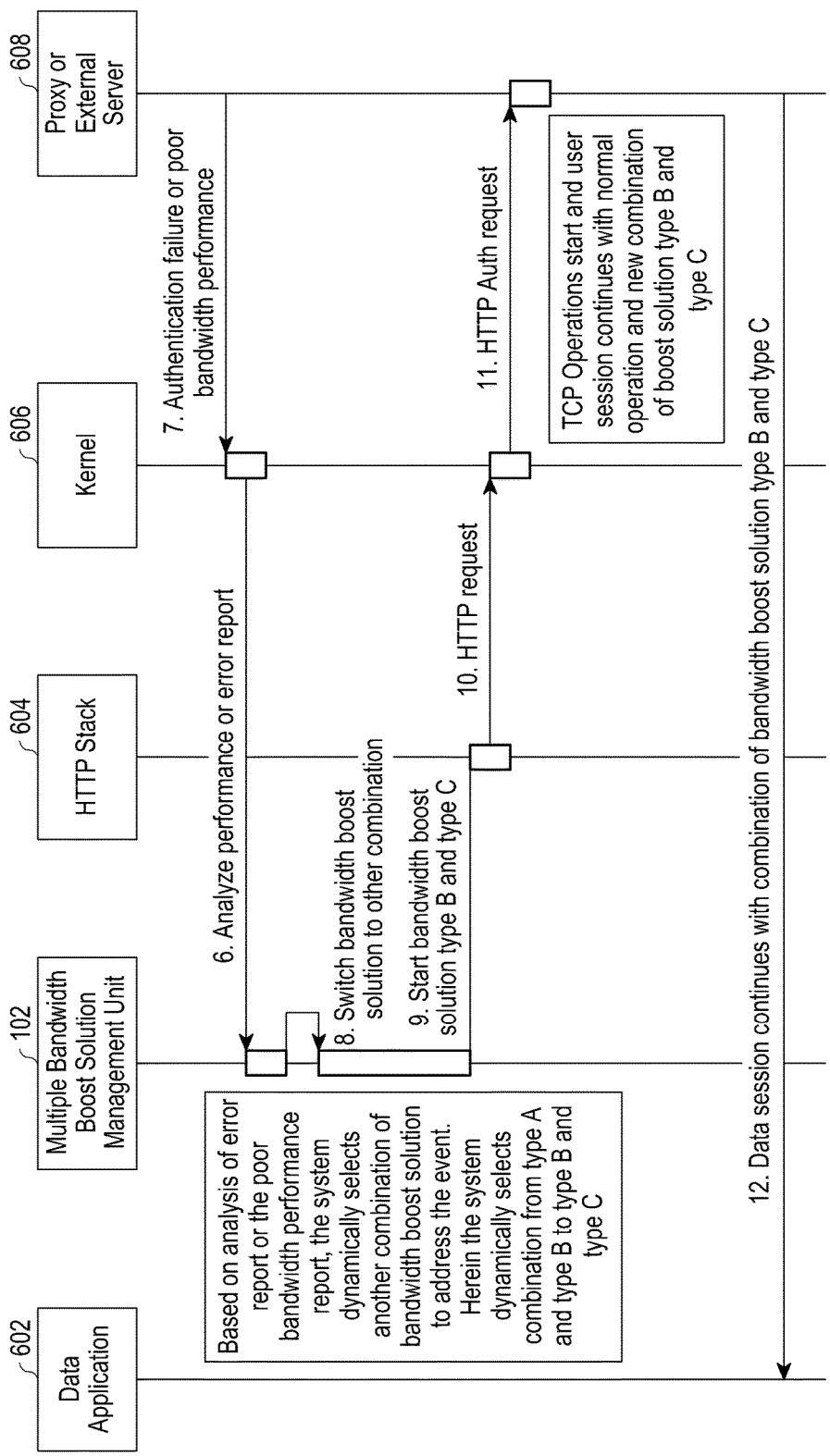

FIG. 6A and 6B are a sequence diagram depicting the steps for selecting a combination of bandwidth boost solutions upon identifying an event in one of the current bandwidth boost solution amongst the combination of bandwidth boost solutions, according to the embodiments as disclosed herein.

In an embodiment, the interactions are ongoing between several blocks consisting of data application 602, multiple bandwidth boost solution management unit 102, HTTP stack 604, kernel 606 and proxy server or external server 608. The data application 602 is a feature in the electronic device 200, which allows the user to connect the electronic device 200, to the internet. Initially, the user starts the ongoing data session using the data application. The multiple bandwidth boost solution management unit 102, allows managing and support for incorporating multiple bandwidth boost solutions. A combination of bandwidth boost solutions 'A' and 'B' are selected in the ongoing session based on various parameters such as congestion scenario, user preference, operator preference or the like. Thus the appropriate bandwidth booster solution is selected and activated. The bandwidth boost solution 'A' is considered to be network dependent, while bandwidth boost solution 'B' is considered to be network independent. The HTTP stack 604 makes the HTTP request through the operating system kernel 606. The kernel 606 sends a HTTP authorization request to the proxy or external server 608. The proxy or external server 608 provides the HTTP response and ongoing data session is started with the combination of bandwidth boost solutions type 'A' and type 'B'. The transport control protocol (TCP) operations start and user session continues with normal operation with the combination of bandwidth boost solutions type 'A' and type 'B'. However, after bandwidth boosting performance analysis and error report analysis, an authentication failure and poor bandwidth performance are detected. This event is having implications on the network dependent bandwidth boost solutions. As a result, the performance of bandwidth boost solution 'A' deteriorates. Thus another bandwidth boost solution 'C' is dynamically selected to address the event. The data session now starts with a combination of bandwidth boost solution type B' and 'C'. Once the combination of bandwidth boost solutions 'B' and 'C' become operational, the HTTP signaling information is exchanged as before. The TCP operations start and ongoing data session continues with normal operation with bandwidth boost solution 'B' and 'C'.

Figure 7A:
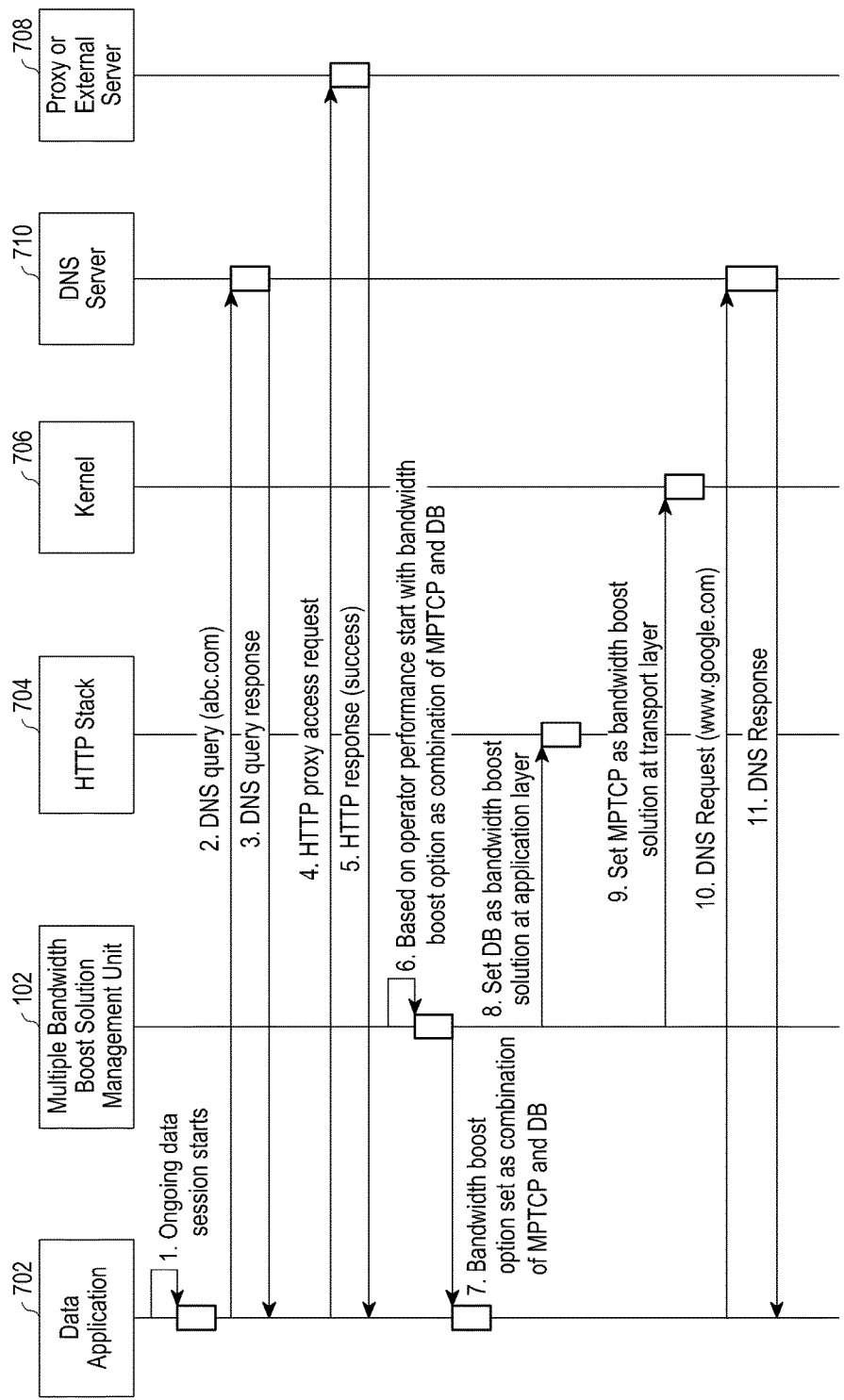
FIG. 7A, 7B and 7C are an example scenario of a sequence diagram depicting the steps of selecting a combination of DB and MPTCP bandwidth boost solutions in an electronic device, according to the embodiments as disclosed herein.
Figure 7B:
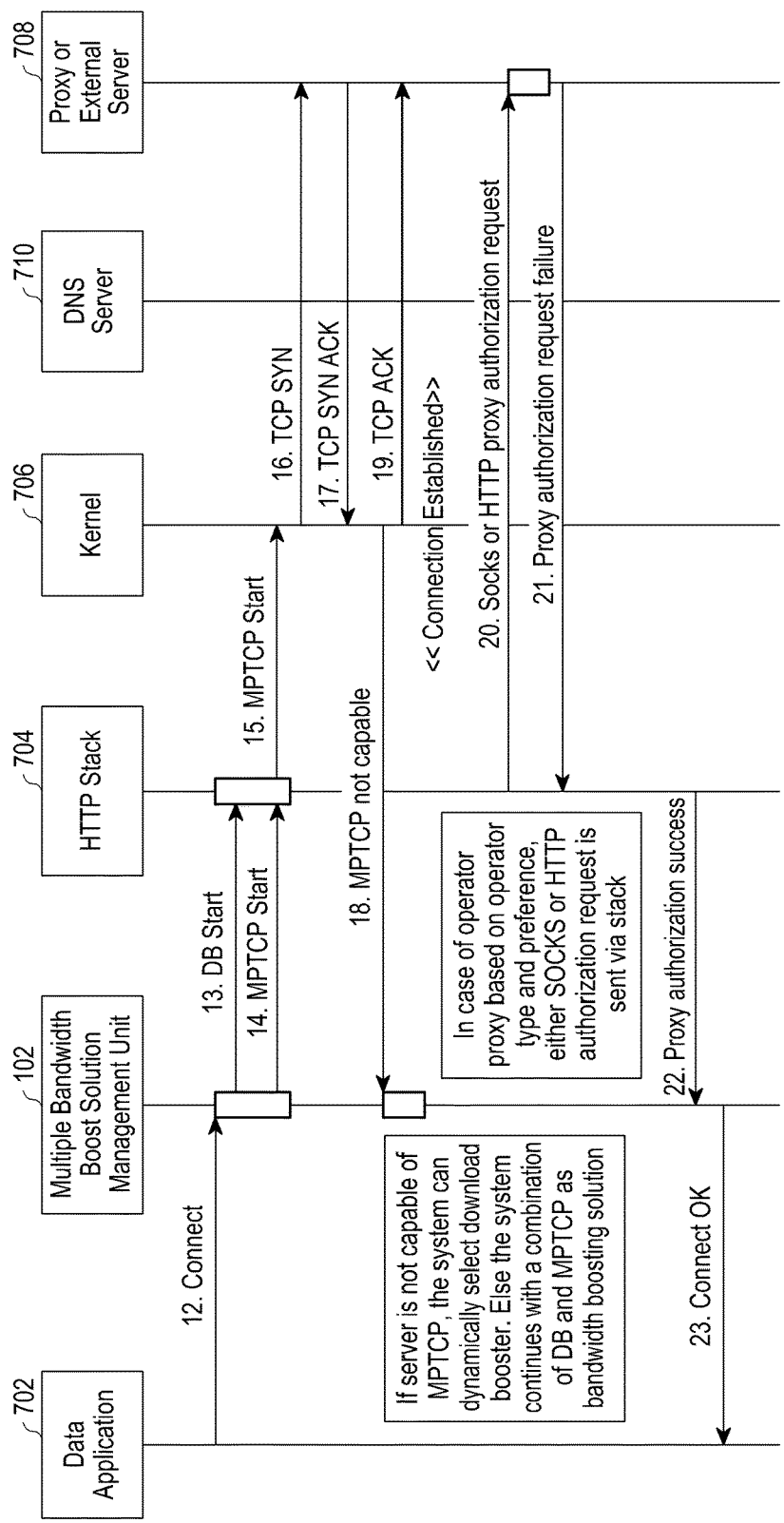
Figure 7C:
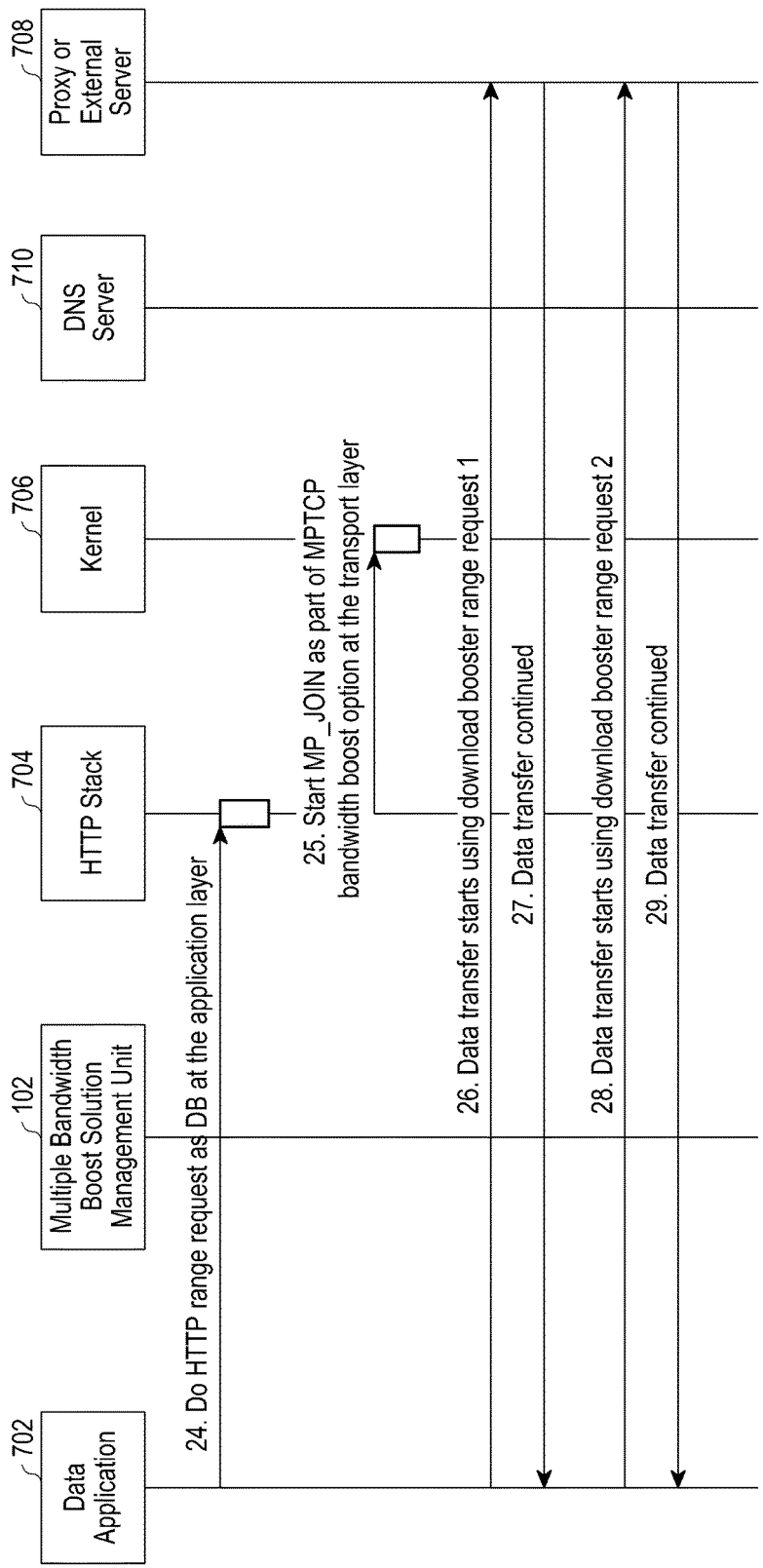

FIG. 7A, 7B and 7C are an example scenario of a sequence diagram depicting the steps of selecting a combination of DB and MPTCP bandwidth boost solutions in an electronic device 200, according to the embodiments as disclosed herein.

In an embodiment, the interactions are taking place between several blocks consisting of data application 702, multiple bandwidth boost solution management unit 102, HTTP stack 704, kernel 706, proxy server or external server 708 and domain name server (DNS) 710. The data application 702 is a feature in the electronic device 200, which allows the user to connect the electronic device 200, to the internet. Initially, the user starts the ongoing data session using the data application. The data application makes a DNS query to the DNS server 710 for mapping the internet protocol (IP) address 'abc.com'. The DNS server 710 sends the DNS query response. The multiple bandwidth boost solution management unit 102, allows managing and support for incorporating multiple bandwidth boost solutions within a single electronic device 200. The HTTP stack 704, makes the HTTP proxy access request to the proxy or external server 708. The proxy or external server 708 provides the HTTP response which is a success. Based on the operator performance the multiple bandwidth boost solution management unit 102, selects a combination of bandwidth boost solutions MPTCP and DB. The multiple bandwidth boost solution management unit 102, sets DB as bandwidth boost option at application layer and MPTCP as bandwidth boost option at transport layer. Once the data application 702, allows the electronic device 200, to connect to the internet with MPTCP and DB as the bandwidth boost solutions respectively, the TCP handshaking begins. The kernel 706 and proxy or external server 708, exchange the TCP handshaking messages 'TCP SYN' (TCP synchronization), 'TCP SYN ACK' (TCP synchronization acknowledgement), and 'TCP ACK' (TCP acknowledgement), between them. Once TCP handshaking messages are successfully exchanged, internet connection is established. The HTTP stack 704 makes a HTTP request to the proxy or external server 708 for authorization of data transmission. The proxy or external server 708 succeeds in authenticating the user. The data application 702 makes HTTP range requests as DB in the application layer. The HTTP stack 704, starts joining requests MP JOIN in order to merge the data streams provided by bandwidth boost solutions MPTCP and DB. As a result, the throughput rate increases significantly and large files in a short span of time. Thus the ongoing data session continues with the combination of MPTCP and DB.

Figure 8:
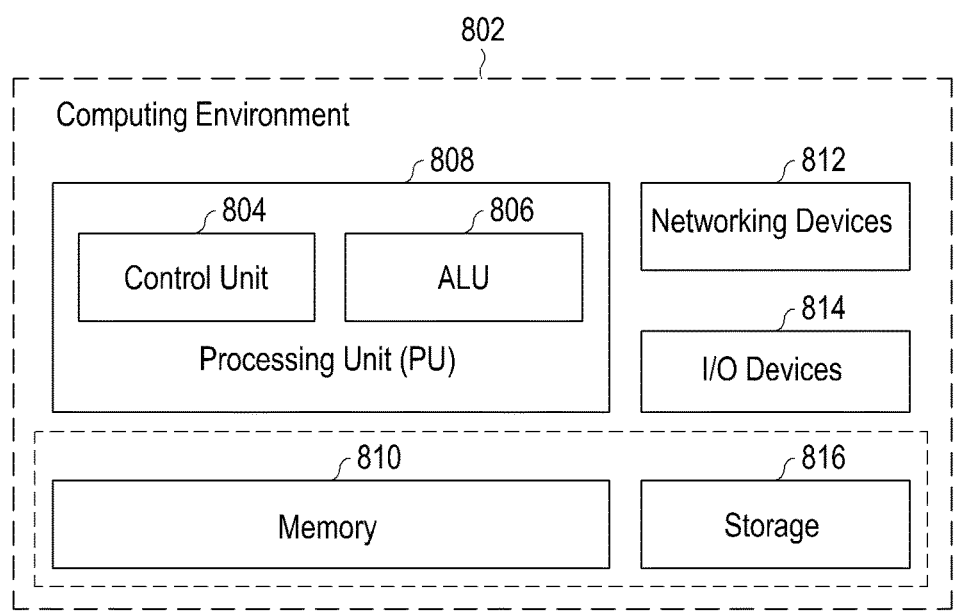
FIG. 8 illustrates a computing environment implementing the method for method for managing multiple bandwidth boost solutions co-existing in an electronic device, according to embodiments as disclosed herein.

FIG. 8 illustrates a computing environment implementing the method for managing multiple bandwidth boost solutions co-existing in an electronic device, according to embodiments as disclosed herein.

As depicted in the FIG. 8, the computing environment 802 comprises at least one processing unit 808 that is equipped with a control unit 804 and an Arithmetic Logic Unit (ALU) 806, a memory 810, a storage 816, plurality of networking devices 812 and a plurality external Input output (I/O) devices 814. The processing unit 808 is responsible for processing the instructions of the technique. The processing unit 808 receives commands from the control unit in order to perform its processing. Further, any logical and arithmetic operations involved in the execution of the instructions are computed with the help of the ALU 806.

The overall computing environment 802 can be composed of multiple homogeneous and/or heterogeneous cores, multiple CPUs of different kinds, special media and other accelerators. The processing unit 808 is responsible for processing the instructions of the technique. Further, the plurality of processing units 808 may be located on a single chip or over multiple chips.

The technique comprising of instructions and codes required for the implementation are stored in either the memory unit 810 or the storage 816 or both. At the time of execution, the instructions may be fetched from the corresponding memory 810 or storage 816, and executed by the processing unit 808.

In case of any hardware implementations various networking devices 812 or external I/O devices 814 may be connected to the computing environment to support the implementation through the networking unit and the I/O device unit.

The embodiments disclosed herein can be implemented through at least one software program running on at least one hardware device and performing network management functions to control the elements. The elements shown in the FIGS. 1 through 8 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein. Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for managing multiple bandwidth boost solutions by an electronic device, the method comprising:
   identifying an ongoing data session related to a combination of a first bandwidth boost solution and a second bandwidth boost solution;
   identifying an erroneous event in the ongoing data session; and
   selecting a combination of a third bandwidth boost solution and a fourth bandwidth boost solution excluding the combination of the first bandwidth boost solution and the second bandwidth boost solution, based on a parameter,
   wherein the first bandwidth boost solution and the second bandwidth boost solution are operated in different layers,
   wherein the third bandwidth boost solution and the fourth bandwidth boost solution are operated in different layers, and
   wherein the first bandwidth boost solution and the second bandwidth boost solution, or the third bandwidth boost solution and the fourth bandwidth boost solution, co-exist within the same electronic device.

2. The method of claim 1, wherein the parameter includes at least one of a network condition, a condition of the electronic device, a user preference, or a previous selection of bandwidth boost solution.

3. The method of claim 1, wherein the first bandwidth boost solution is a bandwidth boost solution based on a multi-path transfer control protocol (MPTCP), and the second bandwidth boost solution is a bandwidth boost solution based on a hypertext transport protocol (HTTP).

4. An electronic device for managing multiple bandwidth boost solutions, the electronic device comprising: at least one processor configured to:
   identify an ongoing data session related to a combination of a first bandwidth boost solution and a second bandwidth boost solution,
   identify an erroneous event in the ongoing data session, and
   select a combination of a third bandwidth boost solution and a fourth bandwidth boost solution excluding the combination of the first bandwidth boost solution and the second bandwidth boost solution, based on a parameter,
   wherein the first bandwidth boost solution and the second bandwidth boost solution are operated in different layers,
   wherein the third bandwidth boost solution and the fourth bandwidth boost solution are operated in different layers, and
   wherein the first bandwidth boost solution and the second bandwidth boost solution, or the third bandwidth boost solution and the fourth bandwidth boost solution, co-exist within a same electronic device.

5. The electronic device of claim 4, wherein the parameter includes at least one of a network condition, a condition of the electronic device, a user preference, or a previous selection of bandwidth boost solution.

6. The electronic device of claim 4, wherein the first bandwidth boost solution is a bandwidth boost solution based on a multi-path transfer control protocol (MPTCP), and the second bandwidth boost solution is a bandwidth boost solution based on a hypertext transport protocol (HTTP).

7. A computer program product comprising computer executable program code recorded on a computer readable non-transitory storage medium, the computer executable program code when executed causing actions including:
   identifying an ongoing data session related to a combination of a first bandwidth boost solution and a second bandwidth boost solution;
   identifying an erroneous event in the ongoing data session; and
   selecting a combination of a third bandwidth boost solution and a fourth bandwidth boost solution excluding the combination of the first bandwidth boost solution and the second bandwidth boost solution, based on a parameter,
   wherein the first bandwidth boost solution and the second bandwidth boost solution are operated in different layers,
   wherein the third bandwidth boost solution and the fourth bandwidth boost solution are operated in different layers, and
   wherein the first bandwidth boost solution and the second bandwidth boost solution, or the third bandwidth boost solution and the fourth bandwidth boost solution, co-exist within a same electronic device.

8. The computer program product of claim 7, wherein the first bandwidth boost solution is a bandwidth boost solution based on a multi-path transfer control protocol (MPTCP), and the second bandwidth boost solution is a bandwidth boost solution based on a hypertext transport protocol (HTTP).

9. The computer program product of claim 7, wherein the parameter includes at least one of a network condition, a condition of the same electronic device, a user preference, or a previous selection of bandwidth boost solution.

* * * * *